G. STACKPOLE.
Rubber-Erasers.
No. 144,364.                                            Patented Nov. 4, 1873.
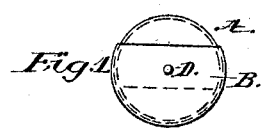
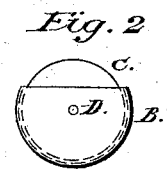
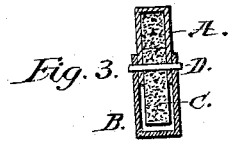
Witnesses                                   Inventor
                                            Greenleaf Stackpole

UNITED STATES PATENT OFFICE.

GREENLEAF STACKPOLE, OF ELIZABETH, NEW JERSEY.

IMPROVEMENT IN RUBBER ERASERS.

Specification forming part of Letters Patent No. 144,364, dated November 4, 1873; application filed April 25, 1873.

To all whom it may concern:

Be it known that I, GREENLEAF STACKPOLE, of Elizabeth, in Union county and State of New Jersey, have invented certain Improvements in Protected Rubber Erasers, of which the following is a specification:

My invention relates to the combination and arrangement of a case containing a rubber eraser; my object being to produce a protected rubber eraser that can be conveniently carried in the pocket, and kept free from dirt by being covered with a case when so carried.

The case is to be made by striking up, with dies, two shells of a semicircular form, one of which is smaller than the other, so that it will fit nicely inside of it. The smaller of the shells is to be provided with a rubber of a circular form, a little more than one-half of the rubber being covered by the shell. The smaller shell is placed within the larger, and a rivet driven through the edges of the shells, and through the center of the rubber, loosely enough that the rubber may turn or be turned to expose a new surface when the old is worn; also, so that the shell may be turned on the rivet so as to entirely cover the rubber, keeping it clean when not in use, or to expose a part of it when wanted for use; the whole making a very neat, compact article, that can be carried in the pocket, and be always clean and ready for use.

In the drawing accompanying, and which is a part of this specification, Figure 1 is a side view of my invention with the rubber C entirely covered, and represented by the dotted lines. D is the rivet which holds them together.

Fig. 2 is a side view of my invention with the rubber exposed, ready for use.

Fig. 3 is a cross-section of my invention, showing the edges of the shells A and B and the rubber C.

Having thus described my invention, what I claim as new, and desire to secure by Letters Patent, is—

The shells A and B, when provided with the rubber C, the whole being held together by the rivet D, substantially as and for the purpose set forth.

GREENLEAF STACKPOLE.

Witnesses:
CHAS. B. BARCLAY,
WM. E. GAVIT.